Oct. 20, 1942.  W. F. DRAY  2,299,710

NOZZLE CONSTRUCTION

Filed July 26, 1940  2 Sheets-Sheet 1

INVENTOR
William Francis Dray
BY Nathaniel Frucht
ATTORNEY

Oct. 20, 1942.  W. F. DRAY  2,299,710
NOZZLE CONSTRUCTION
Filed July 26, 1940  2 Sheets-Sheet 2

INVENTOR
William Francis Dray
BY
Nathaniel Frucht
ATTORNEY

Patented Oct. 20, 1942

2,299,710

UNITED STATES PATENT OFFICE 2,299,710

NOZZLE CONSTRUCTION

William Francis Dray, Providence, R. I., assignor to Davol Rubber Company, a corporation of Rhode Island Application July 26, 1940, Serial No. 347,692

1 Claim. (Cl. 128—239)

My present invention relates to the manufacture of rubber articles, and has particular reference to a novel construction for a syringe nozzle.

It is the principal object of my invention to provide an integral one-piece nozzle construction that can be readily molded from hard rubber or the like.

It is an additional object of my invention to provide a novel construction in which the spray outlet is guarded against clogging and which is of a one-piece integral construction.

With the above and other objects and advantageous features in view, my invention consists of a novel arrangement of parts, more fully disclosed in the detailed description following, in conjunction with the accompanying drawings, and more specifically defined in the claims appended thereto.

Hard rubber nozzles for syringes are well known to the art. These nozzles may be straight or curved and provision may be made for various types of sprays. The present invention is applied to a novel type of nozzle construction having guarded spray outlets.

Figure 1:
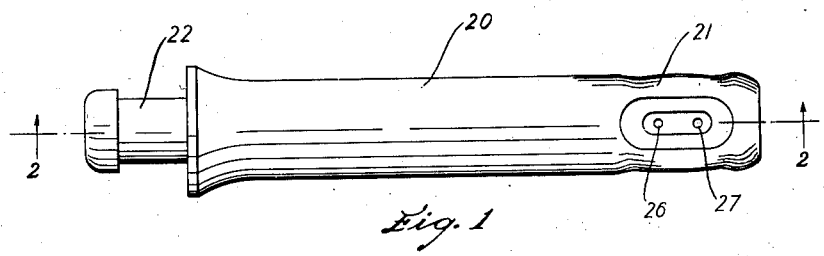
Fig. 1 is a side elevation of a nozzle embodying my invention.
Figure 2:
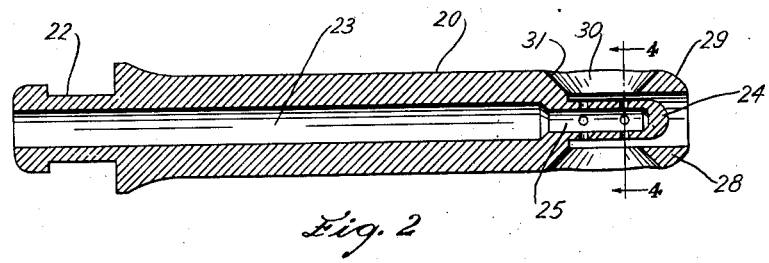
Fig. 2 is a section taken along line 2—2 on Fig. 1.
Figure 3:
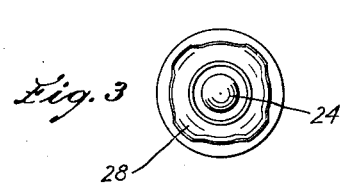
Fig. 3 is a front elevation of the nozzle shown in Fig. 1.
Figure 4:
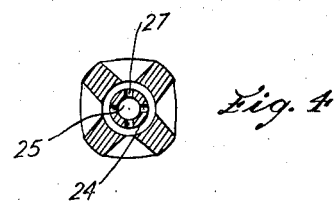
Fig. 4 is a section taken along line 4—4 on Fig. 2.

Referring to the drawings, the nozzle 20 comprises an integral one-piece cylindrical body of hard rubber or other suitable material, provided at the distal end with the spray portion 21 and at the opposite end with a portion 22 adapted to be set into a conventional rubber bulb (not shown). The nozzle is provided with a central bore 23 communicating the bulb end 22 with the nozzle end 21. The nozzle end 21 is of an open ended annular counter bore construction and comprises an inner annular head 24 integral with the main body portion of the nozzle and extending axially therefrom. The inner annular head 24 is provided with a central bore 25 communicating with the main central bore 23 in the nozzle body and has a closed outer end. The head 24 is also provided with spray openings 26 and 27 spaced along its length, each set of openings comprising outlet channels extending transversely through the head 24 and intersecting at right angles. Spaced from the central head portion 24 is an outer integral guard portion 28 which surrounds the central head portion and extends axially from the main body portion of the nozzle beyond the end of the head portion 24, as shown in Fig. 2. The portion 28 may be slightly tapered, as at 29, to provide a blunt end and is provided with four spray outlets 30 on opposite sides of the guard portion 28 and registering with the openings 26 and 27 as shown in Fig. 1. The spray outlets 30 are preferably oval in shape and the sides thereof taper outwardly as at 31 in Fig. 2. The portion of the guard 28 between the spray openings 30 may be curved outwardly to provide a more rounded nozzle portion and for strengthening purposes.

The construction hereinabove described provides a nozzle of integral construction molded in a single piece. The main body portion 20 may be straight, as illustrated, or may be curved to any shape desired. The nozzle portion 21 is so constructed that the outlet openings 26 and 27 are always unobstructed for the free passage of the liquid either through the outlets 30 or, if these channels are pinched and stopped up, around the head 24 and out through the front of the nozzle.

Figure 6:
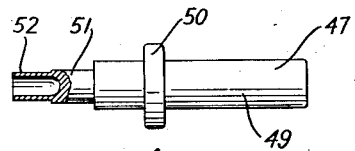
Fig. 6 is a side elevation, partly in section, of one of the molding cores.
Figure 7:
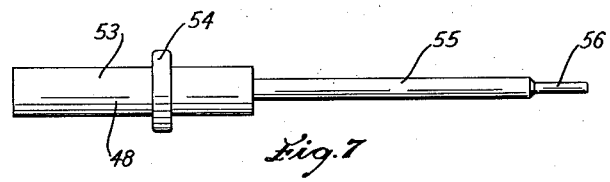
Fig. 7 is a side elevation of the other molding core.
Figure 8:
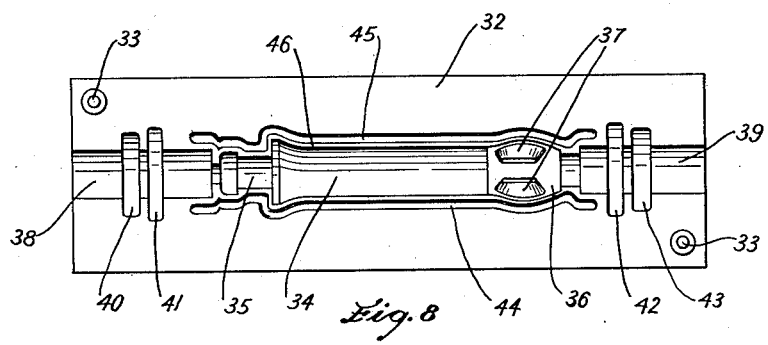
Fig. 8 is a top plan view of one half of the mold.

In molding the nozzle heretofore described I prefer to use a two piece cavity mold which permits multiple molding; for the purposes of illustration however, the mold illustrated in Figs. 5 to 10 inclusive is shown as a single cavity mold. The lower half 32 of the mold is shown in Fig. 8, the upper half (not shown) being similar in all respects except that it is provided with centering openings fitting over the corner dowel pins 33. The mold 32 is provided with a central cavity 34 for molding the main body portion 20 of the nozzle. The cavity 34 has a portion 35 at one end adapted to mold the portion 22 of the nozzle and a nozzle cavity portion 36 shaped to mold the external guard portion 28 of the nozzle including abutment 37 for forming the outlets 30 of the guard portion. Communicating with each end of the cavity are channels 38 and 39 having transverse groove portions 40 and 41 at one end and 42 and 43 at the other end. The portions 40 and 43 are semi-circular grooves adapted to form annular groove portions when the die is closed and the portions 41 and 42 are merely rectangular transverse grooves for a purpose hereinafter to be described. Surrounding the main cavity portion of the die are grooves 44 and 45 slightly spaced from the main cavity portion and separated therefrom by a narrow ledge portion 46.

Figure 9:
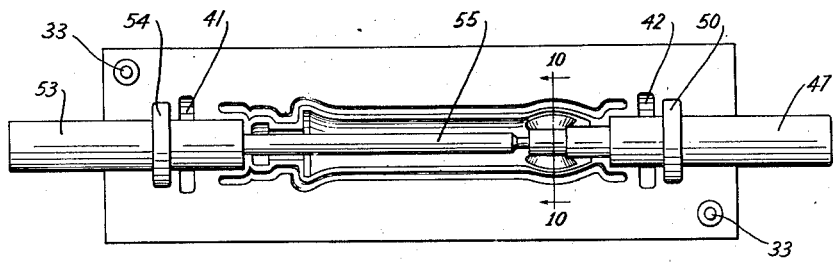
Fig. 9 is a similar view with the cores in place.

The internal portions of the nozzle, including the channels and openings and the head 24, are formed by the use of cores 47 and 48 illustrated in Figs. 6 and 7. The core 47 comprises a main body portion 49 having a transverse annular collar 50 adapted to set into the groove 43 of the mold. This collar portion 50 centers the core 47 in the mold. The portion 49 is provided with an integral end portion 51 of annular cross section and having a narrow hollow tubular end section 52 adapted to mold the head 24 of the nozzle. The core 47 is set into the mold 32 as shown in Fig. 9.

Figure 5:
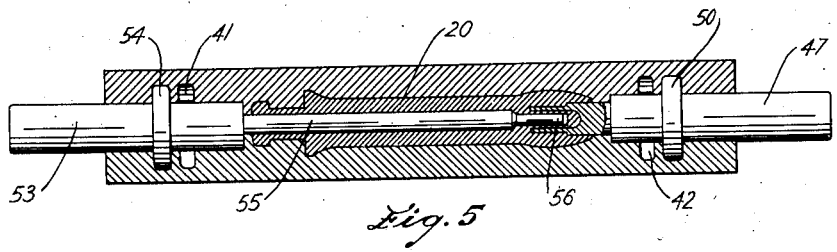
Fig. 5 is a sectional view of the nozzle within the mold.

The core portion 48, illustrated in Fig. 7, comprises a main body portion 53 and a transverse annular collar 54 adapted to center the core by setting into the groove 40. The main body portion 53 is provided with an integral elongated narrow annular portion 55 which in turn is provided with a narrow annular head 56 which extends into the portion 52 on the core 47 when the cores are assembled in the mold. The portion 55 forms the channel 23 in the nozzle and the head 56 forms the channel portion 25 in the head 24 of the nozzle. When the cores are set into the mold as shown in Fig. 9 the mold is filled with rubber compound or other suitable material and the nozzle is molded as shown in Fig. 5. The nozzle may then be set by vulcanizing, or by any other suitable means.

Figure 10:
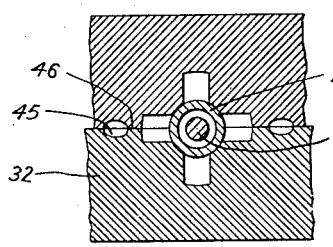
Fig. 10 is a section taken along line 10—10 on Fig. 9.

In compressing the two mold portions the excess rubber will spread outwardly into grooves 44 and 45 as shown in Fig. 10, the ledge 46 acting as a knife edge and trimming the nozzle in the mold.

The aforementioned mold is simple in construction and provides a simple and economical means of molding the nozzle 20 in a single operation in one integral piece. Subsequent to the molding operation, the openings 26 and 27 are drilled through the head 24, the space between the head and guard may be reamed, and the nozzle may be suitably ground and polished.

In the construction shown, the discharge openings 26 and 27 are guarded from being stopped up, and, the molding die and method of molding are suitable for molding different shapes, sizes and designs of nozzles with slight changes in the mold cavity and core insert.

While I have described a specific embodiment of my invention and a specific mold and method of molding the same, it is obvious that changes in the size, shape and arrangement of the parts and in the mold and molding method may be made to suit the requirements for different nozzle designs withous departing from the spirit and the scope of the invention as defined in the appended claim.

I claim:

An integral one-piece syringe nozzle comprising a generally cylindrical body having a longitudinal bore, the distal end of the body terminating in a nozzle end having an open ended annular counterbore with openings in the walls thereof, and a cylindrical head in said nozzle end extending inwardly from the body and positioned in said counterbore in alignment therewith and spaced from the walls thereof to provide a continuation of the longitudinal bore, said head having spray openings in its walls and a closed terminal end.

WILLIAM FRANCIS DRAY.